US007103200B2

(12) United States Patent
Hillhouse et al.

(10) Patent No.: US 7,103,200 B2
(45) Date of Patent: Sep. 5, 2006

(54) METHOD AND SYSTEM FOR ADAPTIVELY VARYING TEMPLATES TO ACCOMMODATE CHANGES IN BIOMETRIC INFORMATION

(76) Inventors: Robert Hillhouse, Unit 4B, 120 Holland Avenue, Ottawa, ON (CA) K1Y 0X6; John Boyer, 59 Buckingham Private, Ottawa, ON (CA) K1V 0K9

( * ) Notice: Subject to any disclaimer, the term of this patent is extended or adjusted under 35 U.S.C. 154(b) by 756 days.

(21) Appl. No.: 09/797,975

(22) Filed: Mar. 5, 2001

(65) Prior Publication Data
US 2002/0154793 A1 Oct. 24, 2002

(51) Int. Cl.
*G06K 9/00* (2006.01)

(52) U.S. Cl. ............ 382/115; 382/209; 382/312; 713/186

(58) Field of Classification Search ........ 382/115, 382/124, 278, 128, 209, 312; 235/380, 376; 380/255, 258; 713/186, 172, 182, 185
See application file for complete search history.

(56) References Cited

U.S. PATENT DOCUMENTS

| | | | | |
|---|---|---|---|---|
| 3,699,519 A | * | 10/1972 | Campbell | 382/125 |
| 4,724,542 A | * | 2/1988 | Williford | 382/119 |
| 5,067,162 A | * | 11/1991 | Driscoll et al. | 382/126 |
| 5,210,797 A | * | 5/1993 | Usui et al. | 382/126 |
| 5,280,527 A | * | 1/1994 | Gullman et al. | 713/184 |
| 5,432,864 A | * | 7/1995 | Lu et al. | 382/118 |
| 5,878,157 A | * | 3/1999 | Mukohzaka | 382/124 |
| 6,072,891 A | * | 6/2000 | Hamid et al. | 382/116 |
| 6,128,398 A | * | 10/2000 | Kuperstein et al. | 382/118 |
| 6,182,221 B1 | * | 1/2001 | Hsu et al. | 713/186 |
| 6,195,477 B1 | * | 2/2001 | Denuto et al. | 385/15 |
| 6,219,439 B1 | * | 4/2001 | Burger | 382/115 |
| 6,259,805 B1 | * | 7/2001 | Freedman et al. | 382/124 |
| 6,311,272 B1 | * | 10/2001 | Gressel | 713/186 |
| 6,484,260 B1 | * | 11/2002 | Scott et al. | 713/186 |
| 6,496,595 B1 | * | 12/2002 | Puchek et al. | 382/124 |
| 6,504,470 B1 | * | 1/2003 | Puchek et al. | 340/5.53 |

FOREIGN PATENT DOCUMENTS

| | | |
|---|---|---|
| EP | 1 071 032 A2 | 1/2001 |
| GB | 2 104 698 A | 3/1983 |
| WO | WO 98/50880 A1 | 11/1998 |

OTHER PUBLICATIONS

Herbst et al., "Automatic Signature Verification Based on Accelerometry" IBM J. of Research and Development, vol. 21, No. 3, pp. 245-253, XP002206895, May 1977.
"Supervised Adaptation for Signature Verification System", IBM Technical Disclosure Bulletin, IBM Corp., New York, USA, vol. 21, No. 1, pp. 424-425, XP00205796, Jun. 1, 1978.

* cited by examiner

*Primary Examiner*—Sheela Chawan
(74) *Attorney, Agent, or Firm*—Woodcock Washburn LLP (57) ABSTRACT

A method of authenticating a user in dependence upon biometric input information is disclosed. According to the method when a user is identified, their biometric information or data derived therefrom is automatically stored. The data is then used in subsequent user identification attempts as a template. The original templates are not replaced but those templates that are automatically stored are replaced at intervals.

31 Claims, 4 Drawing Sheets

METHOD AND SYSTEM FOR ADAPTIVELY VARYING TEMPLATES TO ACCOMMODATE CHANGES IN BIOMETRIC INFORMATION

FIELD OF THE INVENTION

The invention relates generally to biometric security systems and more particularly to a method of automatically updating biometric templates based on varying aspects of biometric information provided from a same biometric information source.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to an access control device (i.e. The combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords that are relatively insecure. As such, many password systems are easily accessed through a simple trial and error process.

A security access system that provides substantially secure access and does not require a password or access code is a biometric identification system. A biometric identification system accepts unique biometric information from a User and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5.109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, if much of the research focus in biometrics has been directed toward improving the input transducer and the quality of the biometric input data. Fingerprint characterization is well known and can involve many aspects of fingerprint analysis. The analysis of fingerprints is discussed in the following references, which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1970:

Feri Pernus, Stanko Kovacic, and Ludvik Gyergyek, "Minutaic Based Fingerprint Registration," IEEE Pattern Recognition. pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978, K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73–18, Purdue University, School of Electrical Engineering, 1973;

Wegstein, An Automated Fingerprint Identification System, NBS special publication, U.S. Department of Commerce/ National Bureau of Standards, ISSN 0083-1883; no. 500-89, 1982;

Moenssens, Andre A., Fingerprint Techniques, Chilton Book; Co., 1971: and,

Wegstein and J. F. Rafferty, The LX39 Latent Fingerprint Matcher, NBS special publication, U.S. Department of Commerce/National Bureau of Standards; no. 500-36, 1978.

In the past, user authorization based on biometric information was conducted by correlating a single instance of biometric information against a template. By using th is method, a percentage of the population is difficult to authenticate. Further, due to skin damage and injuries, sometimes biometric information is not suited to identification. A sore throat affecting voice information and scraped fingertips affecting fingerprint information are two examples of common problems with authorization in dependence upon biometric information.

Biometric information is commonly subject to minor variations over time. For example, as the temperature drops below freezing, the air becomes much more dry. With the dry weather comes drier skin. Some people experience significant problems with fingerprint readers when their skin varies with changing weather conditions. It would be advantageous to provide a biometric identification system that automatically compensates for variations that result over time.

OBJECT OF THE INVENTION

It is an object of this invention to provide a method for automatically compensating for variations in biometric information that result over time or are temporary in nature.

SUMMARY OF THE INVENTION

In accordance with the invention there is provided a method of identifying a user comprising the steps of:
a) receiving, a biometric information sample from the user for use in identifying the user;
b) determining electronic data representing said biometric information sample of the user;
c) analyzing the electronic data to compare the electronic data against first stored data relating to identifications of users;
d) when a substantial match is found, identifying the individual; and,
e) when a difference between the electronic data and the first stored data is above a predetermined other threshold, comparing the electronic data against adaptive enrolments, the adaptive enrolments relating to biometric information samples provided by the user for use in identifying the user by the steps a) through (e).

In accordance with the invention there is also provided a method of identifying a user comprising the steps of:
a) receiving a biometric information sample from the user for use in identifying the user;
b) determining electronic data representing said biometric information sample of the user;
c) analyzing The electronic data to compare the electronic data against stored data, the stored data relating to identifications of users;
d) when a substantial match is found, performing the steps of: identifying the individual; storing the electronic data in association with the user identification as further stored data; determining from the further stored data comparison data for use in identifying the user and different from the stored data: and,
e) when a difference between the electronic data and the stored data is above a predetermined other threshold, comparing the electronic data against other stored data, the other stored data relating lo biometric information samples provided for use in identifying the user according to steps (a) to (e).

In accordance with the invention there is also provided a method of identifying a user comprising the steps of:
receiving a biometric information sample from the user for use in identifying the user;
determining electronic data representing said biometric information sample of the user;
analyzing the electronic data to extract features for comparison with stored electronic data;
comparing the extracted features against stored electronic data, the stored electronic data relating to identifications of users; when a substantial match is found, performing the steps of:
identifying the individual;
determining a number of times that the user has been identified and when the number is one of at least a predetermined number;
storing the electronic data in association with the user identification as further stored data;
determining from the further stored data comparison data for use in identifying the user and different from the stored data; and,
when a difference between the electronic data and the stored data is above a predetermined other threshold, comparing the electronic data against other stored data, the other stored data relating to biometric information samples provided for use in identifying the user.

In accordance with the invention there is also provided a method of identifying a user comprising the steps of:
forming at least a first template including biometric features for use in identifying an individual;
forming a history file including a plurality of biometric information samples each provided by the same individual at different times for use in identifying the individual;
forming at least an adaptive enrollment template from the biometric information samples in the history file,
wherein an individual is identified by registering, provided biometric information sample against the at least a first template and, when registration is not successful registering the provided biometric information sample against the at least an adaptive enrollment template.

DETAILED DESCRIPTION OF THE INVENTION

The invention is described with respect to finger print registration. The method of this invention is applicable to other biometric verification process as is evident to those of skill in the art.

There are two common architectures for use with biometric identification systems, one-to-one and one-to-many. In one-to-one biometric identification, a user is identified separate from the biometric identification process and the identification is verified by verifying biometric data provided with a template associated with the identified individual. Such a system, because only one instance of sensed biometric information is compared against one template, is relatively secure. That said, the architecture is not well suited to some applications. In a one-to-many architecture, a single fingerprint is compared against numerous templates to isolate a template that most closely matches biometric information provided. The security of the system is often lower than that of a system employing a one-to-one architecture but a one-to-many architecture allows for user identification with no input data other than the biometric information sample.

One of the problems with a finger print biometric is that a segment of the population can have temporary skin conditions which cause poor image quality on the scanning device or changes in fingerprint qualities which in turn causes them to experience high false rejection rates. One method of overcoming this problem is to allow the use of any fingertip. Unfortunately, such a method results in a large database of templates and, thereby results in greatly reduced overall security for one-to-many fingerprint identification systems.

Figure 1:
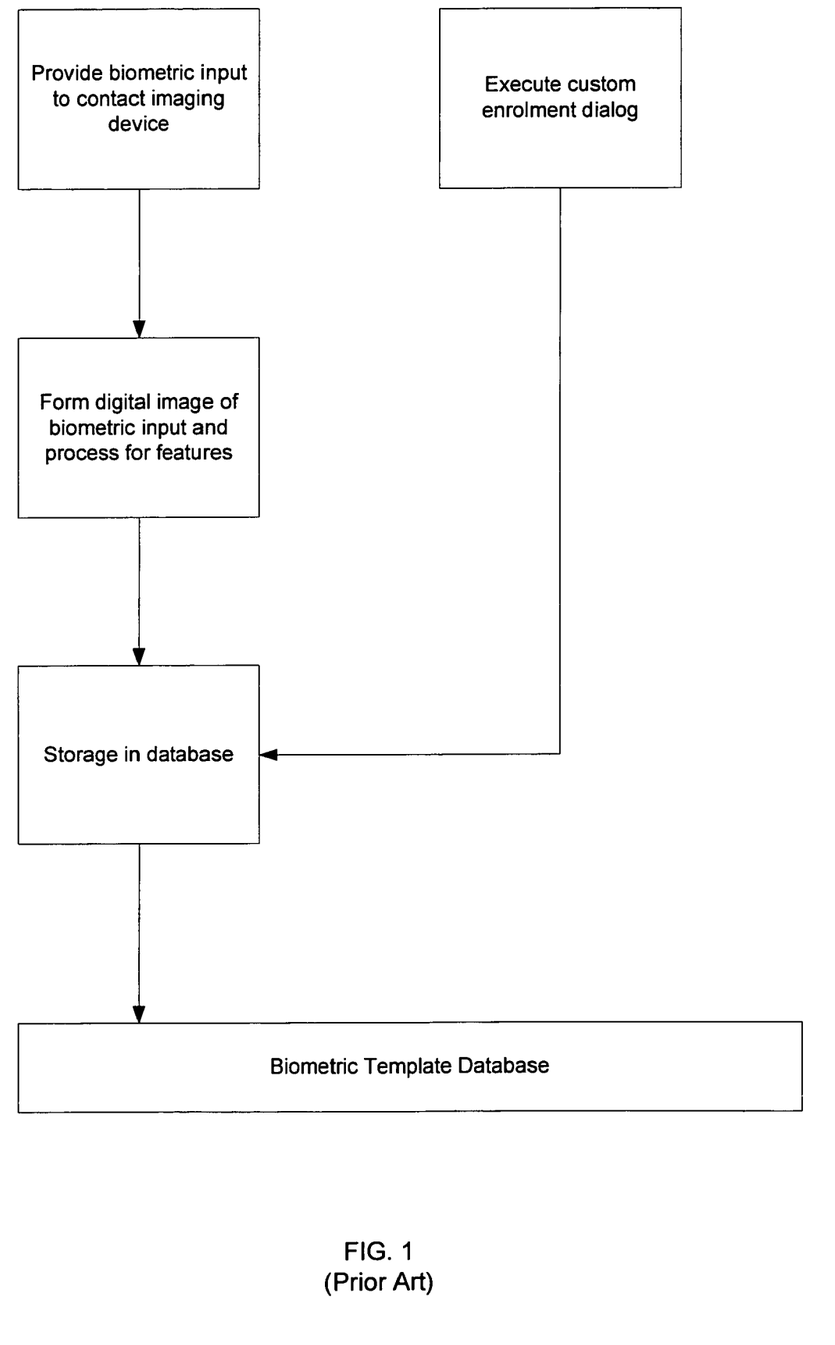
FIG. 1 shows a simplified flow diagram of a process for biometric enrollment, according to the prior art.

Referring to FIG. 1, a flow diagram of a prior art embodiment for biometric identification is shown. Biometric templates are stored via a static designated biometric enrollment process. This process is consciously executed each time a user desires to update an individual biometric template, and involves presenting the specified biometric information sample to a sensor when in execution of a custom enrollment dialog. Since the user consciously executes this enrollment process, additional expertise is implied. Alternatively, the process is executed periodically by security personnel implying a need for additional resources.

The motivation for executing this process at regular intervals is that any particular biometric information sample, being linked to a constantly changing organic signature, typically evolves with the passage of time. In some instances, this leads to a significant increase in the false rejection rate over the span of a few months. The false rejection rate is the ratio of rejections in the form of failed comparisons to acceptances in the form of accurate comparisons for a valid biometric information sample. This results in reduced usability, significant additional administrative overhead, and frustration.

In order to improve the biometric enrollment process the present embodiment provides a method that enables ongoing adaptive enrollment of biometric information samples during normal daily operation of a biometric identification system. The adaptive enrollment process is transparent to the user and requires minimal administrative overhead. The false rejection rate is maintained at an approximately constant level, improving the usability of the system over prior art systems. Notification is provided to administrators as individual biometric information samples begin to vary in a divergent fashion from the originally registered biometric information samples, allowing administrators to schedule static reenrollment of biometric information samples in a controlled manner as necessary.

Figure 2:
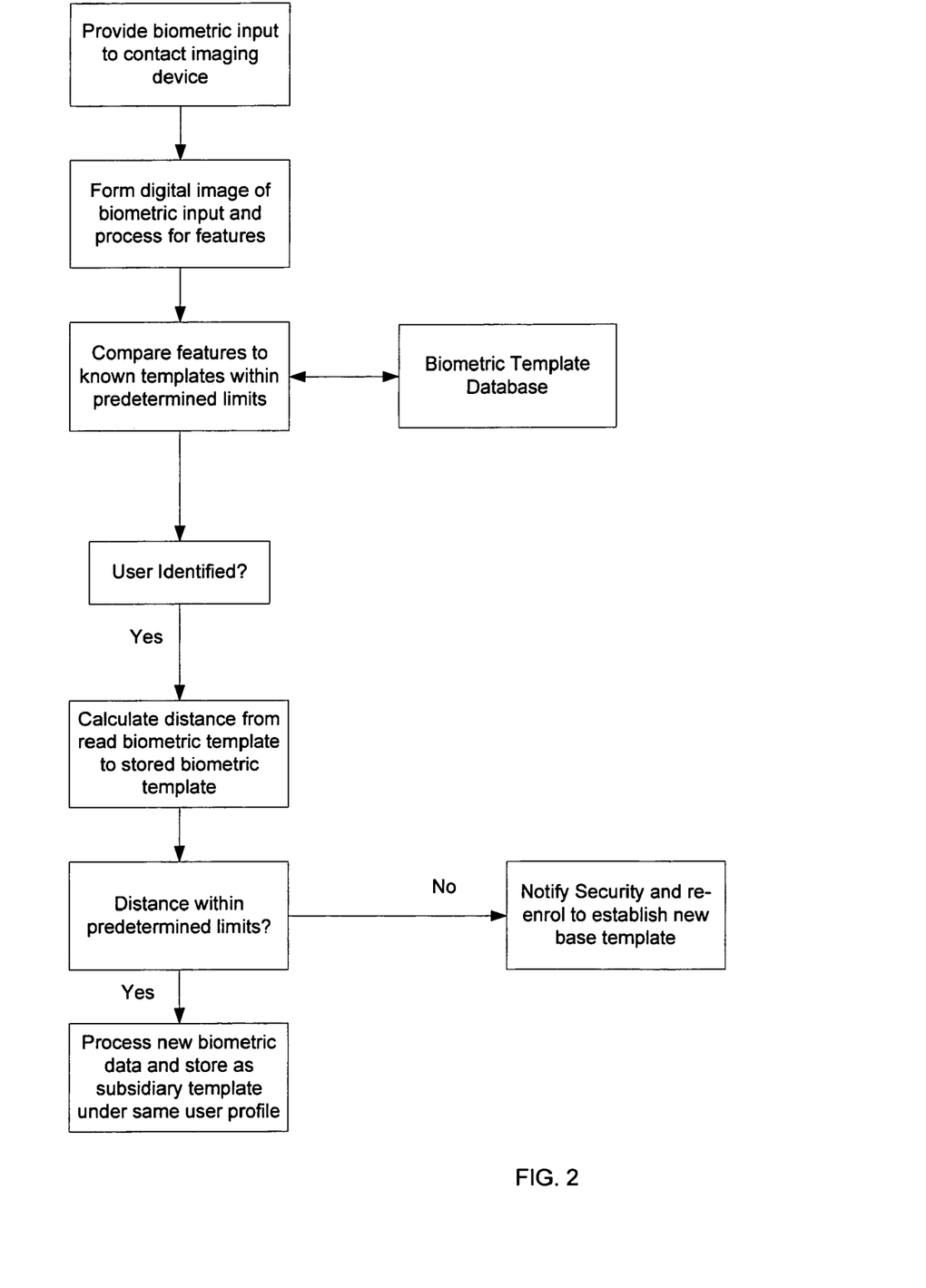
FIG. 2 shows a simplified flow diagram of all adaptive biometric enrollment method, according to the present invention.

Referring to FIG. 2, a simplified flow diagram of an embodiment of an adaptive biometric enrollment method is shown. A user provides biometric information to a contact imaging device. The biometric information is imaged and a digital representation of the biometric information is formed. The digital representation is then analysed to determine features forming a part thereof. These features are then compared to templates of features relating to known individuals. When a feature match occurs within predetermined limits, the user is identified as the related known individual.

Of course, it is well known that biometric information varies over time. For example, if a hand is soaked in water for a length of time, the fingerprint changes. Similarly, when the weather is extremely dry a fingerprint changes a bit. Further, different imaging devices rely on different phenomena. Some imagers require some moisture to effectively image but cannot tolerate too much moisture. Of course, as seasons change, moisture levels in the air vary and so do moisture levels within peoples' skin.

When features within a digital representation match those of a template, a distance between the digital representation and the template is calculated. This distance is used to determine whether the digital representation should be stored as a subsidiary template. Adaptive enrollments in the form of subsidiary templates are useful to allow for compensation for variations in biometric information that occur over time. For example, as the weather gets colder, the fingertips grow drier causing effective changes in the imaged fingerprint. By storing new adaptive enrollments in the form of subsidiary templates when a user is identified, the system is provided with templates that more closely match a current biometric information sample of the user.

In FIG. 2, the digital representation is outside a predetermined distance from the template and as such is stored as an adaptive enrolment. The digital representation is also compared to determine a distance from the originally enrolled template. When the distance is beyond a predetermined maximum distance, security is notified to re-enroll the user to establish a new base template. This prevents templates from drifting too far from the originally enrolled template. Of course, as shown in FIG. 2, the adaptive enrolment is a first adaptive enrolment for the tiger and as such the distance from the originally enrolled template is within the predetermined limits.

Figure 3:
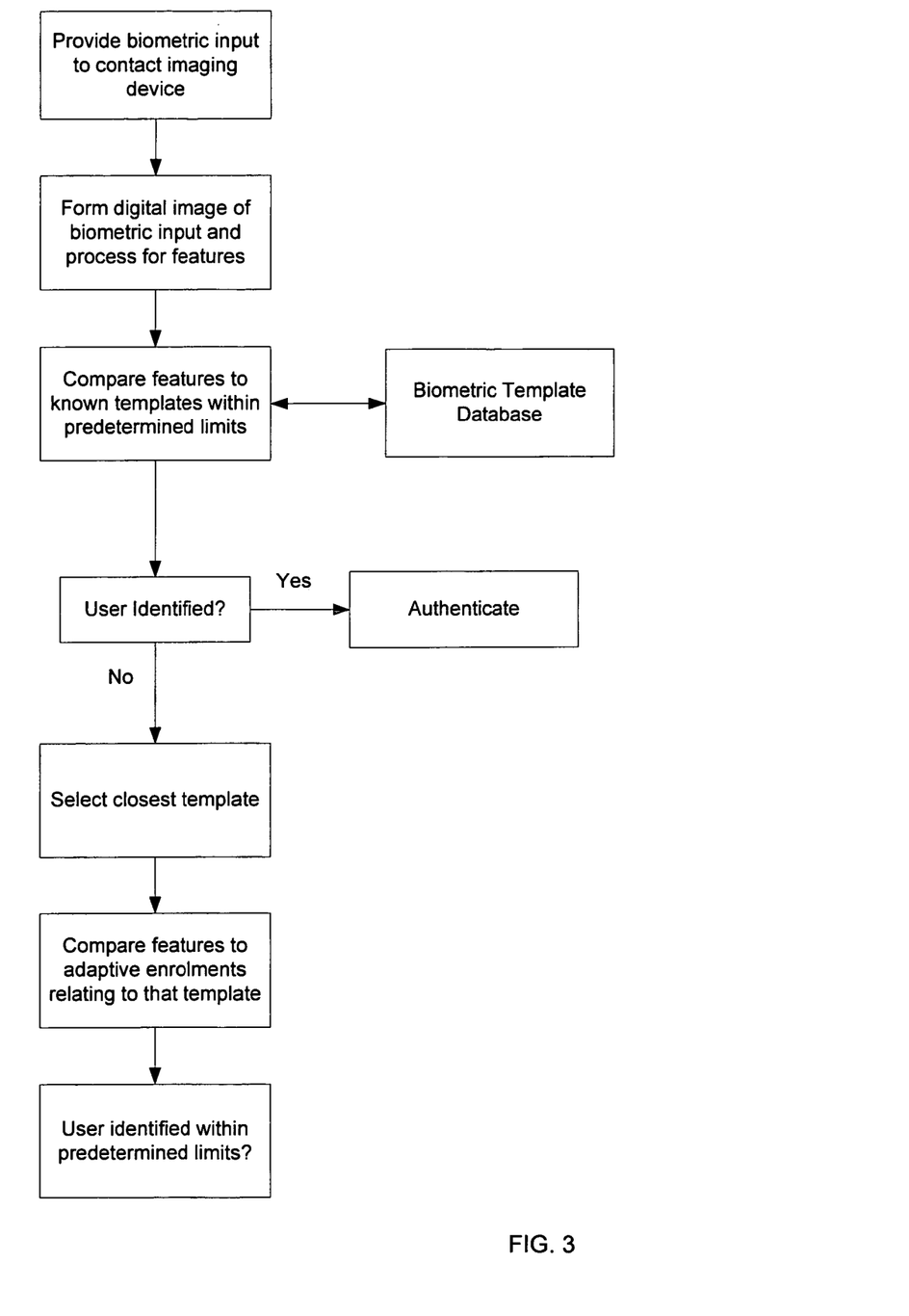
FIG. 3 shows a simplified flow diagram of a method for recognizing a user in dependence upon a biometric input, according to the present invention: and, FIG. 4 shows a simplified flow diagram of a method for comparing biometric information against three adaptive enrollments updated in a circular fashion, according to the present invention.

Referring to FIG. 3, a flow diagram of a method of recognizing a user is shown. A user provides biometric information to a contact imaging device. The biometric information is imaged and a digital representation of the biometric information is formed. The digital representation is then analyzed to determine features forming a part thereof. These features are then compared to templates of features relating to known individuals. When a feature match occurs within predetermined limits, the user is identified as the related known individual.

In the flow diagram of FIG. 3, none of the original templates match the features within predetermined limits. The closest template is then selected and the features are compared against adaptive enrolments relating to that template. Alternatively, several closest templates are selected. When a match is determined within the predetermined limits or within other predetermined limits depending on design parameters, the user is identified. Thus there is no performance impact during an authentication that compares successfully against a statically enrolled biometric and the performance impact for failed registrations is very small. The recognition of individuals who would heretofore have been falsely rejected is advantageously achieved.

Figure 4:
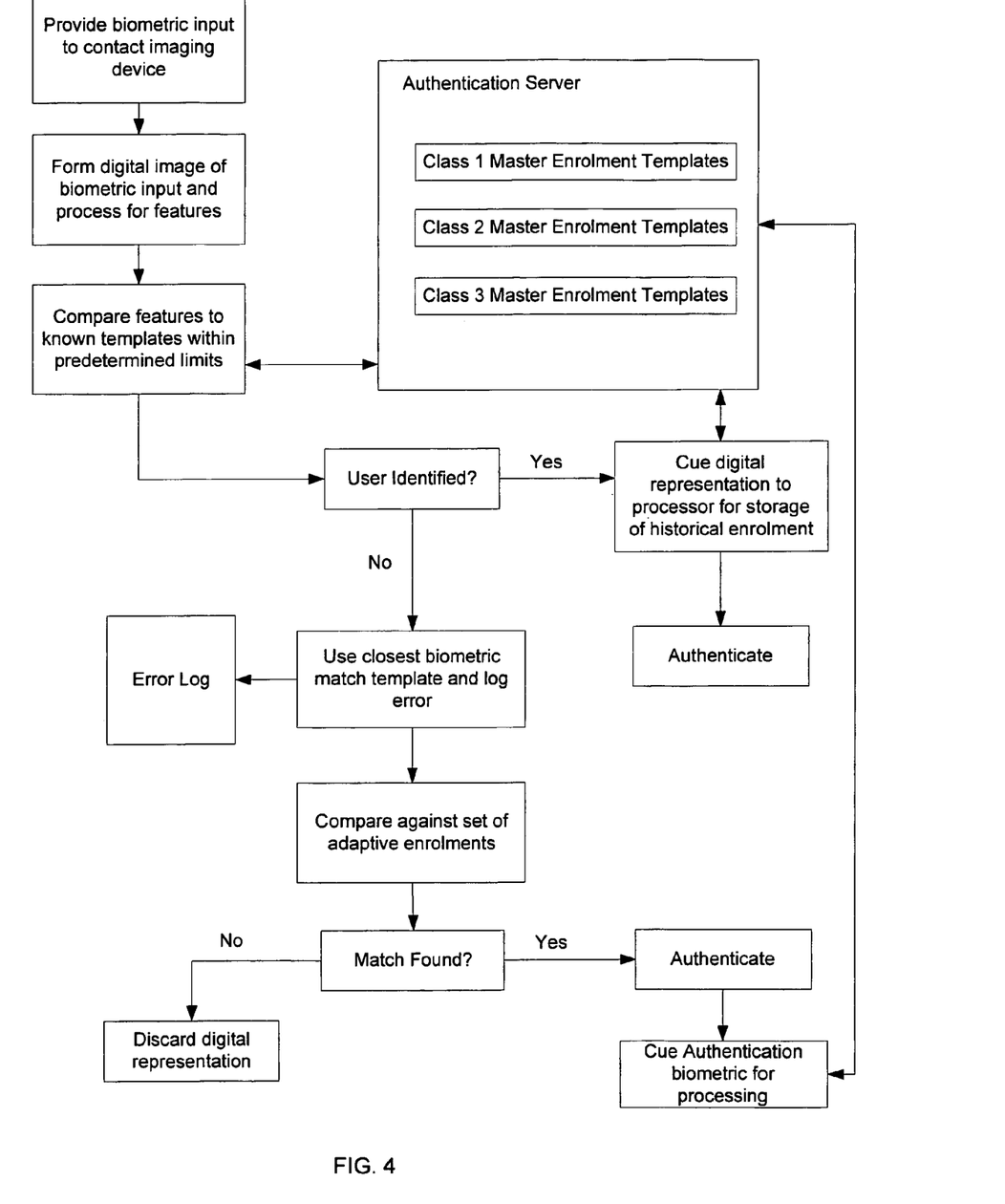

In a preferred embodiment, an authentication server database memory diagram for which is shown in FIG. 4, three classes of biometric template enrollments are stored in the authentication server database. A master enrollment, generated from a statically enrolled biometric information source, is stored for each biometric. The maser enrollments are updated during a static enrollment process. A number of historical enrollments are stored for each biometric template based on data within a configuration file. The historical enrollments are updated in a circular fashion by replacing an oldest historical enrollment with a new historical enrollment. A new historical enrollment is generated periodically based on a configuration file defined period. Three adaptive enrollments, composed of the three historical enrollments with the highest composite comparison metric, are stored for each biometric. The adaptive enrollments are updated each time a new historical enrollment is stored. Additional processing required for processing adaptive enrollments typically executes in a background thread on the authentication server.

For example, an adaptive enrollment occurs the first time a user attempts to authenticate biometrically after a span if time greater than the adaptive enrollment period has passed since the last adaptive enrollment. The following procedures is followed:

The provided biometric data in the form of a digital representation is compared against each template in the set of master enrolment templates. If a match is found then authentication occurs and the digital representation is queued for processing by a background thread. If a match is not found then the closest matching template from tie master enrolment templates is used to determine which biometric was presented and a master enrollment match failure is logged. The digital representation is compared against each template in the set of adaptive enrollments for that biometric. In the example of FIG. 4 that is three templates. If a match is found then authentication occurs and the authentication biometric is queued for processing by the background thread. If a match is not found then authentication fails and the digital representation is discarded.

The background thread executes periodically and examines the queue for any digital representations that are newly added. If the queue is empty then the background thread terminates until it is executed again after a time period. If the queue is not empty then each digital representation is processed in turn to form the three adaptive enrolments.

When there exist a predetermined number of historical enrollments associated with a template the oldest digital representation is determined and is compared against all he other historical enrollments in the set in order to calculate a set of comparison metrics. The composite comparison metric for each historical enrollment associated with the template is updated by subtracting the relevant comparison metric. The oldest digital representation is deleted.

When there exist fewer than the predetermined number of historical enrollments associated with a template then the digital representation is compared against all the historical enrollments associated with the master enrollment template in order to calculate a set of comparison metrics. The composite comparison metric for each historical enrollment associated with the template is updated by adding the relevant comparison metric. The digital representation is stored as a new historical enrollment and its composite comparison metric is calculated from the average of the individual comparison metrics for all the other historical enrollments associated with the master template and the master enrollment template.

The three historical enrollments with the largest composite comparison metrics associated with a template are designated the adaptive enrollments associated with the template. These enrollments are copied and restored in order to optimize their retrieval and comparison during the authentication process. Alternatively, they are not copied and their retrieval and comparison requires additional time.

In order to describe the adaptive enrollment process, it is helpful to provide a concise mathematical characterization of a preferred composite comparison metric, as well as the subtraction and addition operations.

The composite comparison metric for historical enrollment i is given by $$m_i = \frac{\sum_{\substack{j=1 \\ j \neq i}}^{n} c(H_i, H_j)}{n-1}, i \in \{1, \ldots, n\}$$

where n is the number of historical enrollments in the set and $c(H_i, H_j)$ is the comparison metric between biometric template i and biometric template j.

The updated composite comparison metric for historical enrollment i after the subtraction operation on historical enrollment j is given by $$m_i = m_i - \frac{c(H_i, H_j)}{n-1}, i \in \{1, \ldots, n\}, i \neq j$$

where n is the number of historical enrollments in the set including historical enrollment j.

The updated composite comparison metric for historical enrollment i after the addition operation on historical enrollment j is given by $$m_i = m_i + \frac{c(H_i, H_j)}{n-1}, i \in \{1, \ldots, n\}, i \neq j$$

where n is the number of historical enrollments in the set including historical enrollment j.

Of course, it is also possible to provide a new historic enrolment with each successful identification. Unfortunately, it is generally found that such a system results in a history that is either too cumbersome to process or unlikely to be of sufficient duration to track many slowly varying changes in biometric information. Preferably, historic enrolments are captured one or two times during a week period.

When the adaptive enrolments are more than a predetermined distance from the master enrolment templates, security is notified to re-enroll the individual. This prevents slow drifting biometric information from overlapping with another user, thereby resulting in false acceptances.

Preferably, more than one master enrollment is used. Using, for example, three master enrollment templates allows for more effective user identification. Alternatively, using more than one master enrollment template allows for selection of diverse templates that are accurate for a particular user as master templates in order to provide enhanced space within which to successfully identify a user.

Though the above method is described with reference to background processing and to minimizing performance impact caused by the method, other implementations of the invention are equally possible.

Numerous other embodiments of the invention may be envisaged without departing from the spirit or scope of the invention.

What is claimed is:

1. A method of identifying a user comprising the steps of:
   a) receiving a contact image biometric information sample from a biometric source of the user for use in identifying the user;
   b) determining electronic data representing said contact image biometric information sample of the user;
   c) analyzing the electronic data to compare the electronic data against biometric templates relating to identifications of users;
   d) when a first threshold corresponding to a substantial match of a template is satisfied, identifying the individual; and,
   e) when a difference between the electronic data and the matched template is above a predetermined second threshold, storing a new biometric template as an adaptive enrollment for the user based on the electronic data relating to biometric information samples for said biometric source as provided by the user for use in identifying the user by (a) through (c).

2. A method according to claim 1 wherein every predetermined number of occurrences of a substantial match:
the electronic data is stored within a history file;
the electronic data is analyzed to determine its suitability for use as the adaptive enrollment; and,
when the electronic data is determined to be suitable, storing the electronic data as the adaptive enrollment.

3. A method according to claim 2 wherein the history file comprises up to N samples of electronic data and wherein an oldest sample of electronic data is deleted when a new sample of electronic data is added to a history file containing N samples.

4. A method according to claim 3 wherein a score is stored in association with each sample electronic data within the history file indicating a suitability of the sample for use as the adaptive enrollment.

5. A method according to claim 4 wherein the score is determined by comparing the sample electronic data against each other sample electronic data within the history file and associated with a same user identification.

6. A method according to claim 5 wherein the score is determined by determining a composite comparison metric, $M_i$ for each sample electronic data, i, $$m_i = \frac{\sum_{\substack{j=1 \\ j \neq i}}^{n} c(H_i, H_j)}{n-1}, i \in \{1, \ldots, n\}$$

where n is the number of historical enrollments in the set and $c(H_i, H_j)$ is the comparison metric between biometric template i and biometric template j.

7. A method according to claim 5 wherein upon deleting a sample electronic data from the history file, its effect on the scores in the history file is approximately reversed.

8. A method according to claim 7 wherein the effect is approximately reversed by recalculating m, after the deletion of sample electronic element j according to $$m_i = m_i - \frac{c(H_i, H_j)}{n-1}, i \in \{1, \ldots, n\}, i \neq j$$

where n is the number of historical enrollments in the set including historical enrollment j.

9. A method according to claim 8 wherein the effect of an added sample electronic element j is determined by calculating $m_i$ according to $$m_i = m_i + \frac{c(H_i, H_j)}{n-1}, i \in \{1, \ldots, n\}, i \neq j$$

where n is the number of historical enrollments in the set including historical enrollment j.

10. A method according to claim 2 wherein the effect of an added sample electronic element j is determined by calculating $m_i$ according to $$m_i = m_i + \frac{c(H_i, H_j)}{n-1}, i \in \{1, \ldots, n\}, i \neq j$$

where n is the number of historical enrollments in the set including historical enrollment i.

11. A method according to claim 2 wherein electronic data samples suitable for use as the adaptive enrollment are compared against the stored data, and when a difference greater than a predetermined difference exists, a notification of such is generated.

12. A method according to claim 2 wherein electronic data samples suitable for use in determining the other stored data are compared against the stored data, and when a difference greater than a predetermined difference exists, the user is prompted to re-enroll in order to provide new biometric information for use in determining new stored data.

13. A method of identifying a user comprising the steps of:
a) receiving a contact image biometric information sample from a biometric source of the user for use in identifying the user;
b) determining electronic data representing said contact image biometric information sample of the user;
c) analyzing the electronic data to compare the electronic data against stored biometric template data relating to identifications of users;
d) when a first threshold corresponding to a substantial match of a template is satisfied:
identifying the individual;
storing the electronic data in association with the user identification as further stored biometric template data;
determining from the further stored biometric template data comparison data for use in identifying the user; and,
e) when a difference between the electronic data and the stored biometric template data is above a predetermined second threshold, comparing the electronic data against other stored biometric template data relating to contact image biometric information samples for said biometric source as provided for use in identifying the user according to (a) to(c).

14. A method according to claim 13 wherein the further stored biometric template data relates to different features of the individual, the features for use in identifying the individual.

15. A method according to claim 13 wherein the step of storing the electronic data in association with the user identification as further stored biometric template data comprises: storing an electronic representation of the biometric information sample associated with the identification.

16. A method according to claim 15 wherein determining from the further stored biometric template data comparison data for use in identifying the user is performed by:
comparing each stored electronic representation associated with the identification against a template derived from each other electronic representation associated with the identification to select at least an electronic representation that best represents the stored electronic representations associated with the identification; and,
determining at least a template from the at least a selected electronic representation.

17. A method according to claim 15 wherein determining from the further stored biometric template data comparison data for use in identifying the user is performed by:
storing with each electronic representation associated with the identification a score indicative of a quality of the stored electronic representations associated with the identification for use in generating a template;
comparing the oldest stored electronic representation associated with the identification against a template derived from each other electronic representation associated with the identification to determine the correction for the score associated with said template;

correcting each score in accordance with the determined corrections;

comparing the newest stored electronic representation associated with the identification against a template derived from each other electronic representation associated with the identification to determine a second correction for each score;

correcting each score in accordance with the determined second correction; and, selecting an electronic representation associated with a best score for use in determining a template for use as the comparison data.

18. A method of identifying a user comprising:

receiving a contact image biometric information sample from a biometric source of the user for use in identifying the user;

determining electronic data representing said contact image biometric information sample of the user;

analyzing the electronic data to extract features for comparison with stored electronic data;

comparing the extracted features against stored electronic data, the stored electronic data relating to identifications of users;

when a substantial match is found, performing:

identifying the individual;

determining a number of times that the user has been identified and when the number is one of at least a predetermined number;

storing the electronic data in association with the user identification as further stored data;

determining from the further stored data comparison data for use in identifying the user; and, when a difference between the electronic data and the stored data is above a predetermined threshold, comparing the electronic data against other stored data, the other stored data relating to additional biometric information samples for said biometric source as provided for use in identifying the user.

19. A method of identifying a user comprising:

receiving a biometric information sample from a biometric source using a contact imaging device that images the biometric source to provide said biometric information sample;

forming from said biometric information sample at least a first template including biometric features for use in identifying an individual;

forming a history file including a plurality of biometric information samples from said biometric source each provided by the same individual at different times for use in identifying the individual; and forming at least one adaptive enrollment template from the biometric information samples from said biometric source in the history file, wherein an individual is identified by registering provided biometric information sample against the at least a first template and, when registration is not successful, registering the provided biometric information sample against the at least one adaptive enrollment template.

20. A method according to claim 19 wherein the at least one adaptive enrollment template is a template formed from one or more biometric information samples within the history file, the one or more biometric information samples selected through a comparison with other biometric information samples within the history file.

21. A method according to claim 20 wherein each biometric information sample stored within the history file is compared against each other biometric information sample within the history file to determine those that are most suitable for use in determining adaptive enrollment templates.

22. A method according to claim 21 wherein the history file comprises up to N biometric information samples and wherein an oldest biometric information sample is deleted when a new biometric information sample is added to a history file containing N samples.

23. A method according to claim 22 wherein a score is stored in association with each biometric information sample within the history file indicating a suitability of that sample for use in determining an adaptive enrollment template.

24. A method according to claim 23 wherein the score is determined by comparing the sample electronic data against each other sample electronic data within the history file and associated with a same user identification.

25. A method according to claim 24 wherein the score is determined by determining a composite comparison metric, $M_i$ for each sample electronic data, i, $$m_i = \frac{\sum_{\substack{j=1 \\ j \neq i}}^{n} c(H_i, H_j)}{n-1}, i \in \{1, \ldots, n\}$$

where n is the number of historical enrollments in the set and $c(H_i, H_j)$ is the comparison metric between biometric template i and biometric template j.

26. A method according to claim 24 wherein upon deleting a sample electronic data from the history file, its effect on the scores in the history file is approximately reversed.

27. A method according to claim 26 wherein the effect is approximately reversed by recalculating $m_i$ after the deletion of sample electronic element j according to $$m_i = m_i - \frac{c(H_i, H_j)}{n-1}, i \in \{1, \ldots, n\}, i \neq j$$

where n is the number of historical enrollments in the set including historical enrollment j.

28. A method according to claim 27 wherein the effect of an added sample electronic element j is determined by calculating $m_i$ according to $$m_i = m_i + \frac{c(H_i, H_j)}{n-1}, i \in \{1, \ldots, n\}, i \neq j$$

wherein n is the number of historical enrollments in the set including historical enrollment j.

29. A method according to claim 28 wherein the effect of an added sample electronic element j is determined by calculating $m_i$ according to $$m_i = m_i + \frac{c(H_i, H_j)}{n-1}, i \in \{1, \ldots, n\}, i \neq j$$

where n is the number of historical enrollments in the set including historical enrollment j.

30. A method according to claim 19 wherein adaptive enrollment templates are compared against the at least a first template and, when a difference greater than a predetermined difference exists, a notification of such is generated.

31. A method according to claim 19 wherein adaptive enrollment templates are compared against the at least a first template and, when a difference greater than a predetermined difference exists, the user is prompted to re-enroll in order to provide new biometric information for use in determining a new at least a first template.

* * * * *